United States Patent
Desabhatla et al.

(10) Patent No.: US 8,554,433 B2
(45) Date of Patent: Oct. 8, 2013

(54) APPARATUS FOR DRIVING SHAFT ROTATION AND METHOD

(75) Inventors: Sreedhar Desabhatla, Bavaria (DE); Girish Kamavarapu, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 13/343,096

(22) Filed: Jan. 4, 2012

(65) Prior Publication Data

US 2013/0173125 A1  Jul. 4, 2013

(51) Int. Cl.
*F02N 11/04* (2006.01)

(52) U.S. Cl.
USPC .......... 701/67; 290/40 A; 123/179.4

(58) Field of Classification Search
CPC .............. F02N 11/08; F02N 11/0818
USPC ........................ 123/179.28, 179.4
See application file for complete search history.

(56) References Cited

U.S. PATENT DOCUMENTS

| | | | | |
|---|---|---|---|---|
| 5,594,322 A * | 1/1997 | Rozman et al. | 322/10 |
| 5,783,932 A * | 7/1998 | Namba et al. | 322/16 |
| 6,838,778 B1 * | 1/2005 | Kandil et al. | 290/31 |
| 8,069,832 B2 | 12/2011 | Okumoto et al. | |
| 2003/0209910 A1 * | 11/2003 | Nelson | 290/52 |
| 2009/0166113 A1 * | 7/2009 | Luo et al. | 180/65.265 |
| 2009/0177345 A1 * | 7/2009 | Severinsky et al. | 701/22 |
| 2010/0021284 A1 | 1/2010 | Watson et al. | |
| 2010/0127496 A1 * | 5/2010 | Burkholder et al. | 290/46 |
| 2011/0101693 A1 * | 5/2011 | Goi et al. | 290/46 |
| 2012/0031104 A1 * | 2/2012 | Copeland | 60/778 |

* cited by examiner

*Primary Examiner* — Khoi Tran
*Assistant Examiner* — Ryan Rink
(74) *Attorney, Agent, or Firm* — Cantor Colburn LLP

(57) ABSTRACT

An apparatus for driving shaft rotation is provided and includes a shaft, which is rotatable about an axis thereof, a machine operably coupled to the shaft to be rotatable with the shaft and configured to be responsive to a load applied thereto and a driving element, which is configured to engage with the shaft at a first predefined speed and a second speed greater than the first predefined speed to drive shaft rotation.

20 Claims, 2 Drawing Sheets

APPARATUS FOR DRIVING SHAFT ROTATION AND METHOD

BACKGROUND OF THE INVENTION

The subject matter disclosed herein relates to an apparatus for driving shaft rotation and, more particularly, to a synchronous machine with a load commutated inverter for high speed start and reduced shutdown duration of a machine.

Driving elements, such as synchronous motor drives with or without load commutated inverters (LCIs), can be used to start any machine or gas turbine engine from a stand still condition or a base speed of about 3-6 rpm. For gas turbine engines in particular, such driving elements are required because gas turbine engines themselves are not self-starting machines. The driving elements are used to bring the gas turbine engines to nearly full speed no load conditions. Typically, this is achieved by coupling a driving element to the rotor of a gas turbine engine whereby the driving element acts as a motor that accelerates the rotor to the speeds at which the gas turbine engine achieves self-sustained operation.

Normally, driving elements are not equipped with a capability to start the machine or gas turbine engine at speeds higher than base or turning gear speed. Because of this constraint, in the exemplary case of a gas turbine engine trip at a high speed, it is necessary to wait until the gas turbine engine roles down to 0 RPMs or the base or turning gear speed before a restart can be initiated. This can sometimes take a relatively long time and lead to economic losses.

BRIEF DESCRIPTION OF THE INVENTION

According to one aspect of the invention, an apparatus for driving shaft rotation is provided and includes a shaft, which is rotatable about an axis thereof, a machine operably coupled to the shaft to be rotatable with the shaft and configured to be responsive to a load applied thereto and a driving element, which is configured to engage with the shaft at a first predefined speed and a second speed greater than the first predefined speed to drive shaft rotation.

According to another aspect of the invention, an apparatus for driving shaft rotation is provided and includes a shaft, which is rotatable about an axis thereof, a machine operably coupled to the shaft to be rotatable with the shaft and configured to be responsive to a load applied thereto, a driving element, which is configured to engage with the shaft at a first predefined speed and a second speed greater than the first predefined speed to drive shaft rotation and a controller operably coupled to the driving element to determine a drive schedule and to control the engagement of the driving element with the shaft in accordance with the determined drive schedule.

According to yet another aspect of the invention, controlling an engagement of a driving element with the shaft at a first predefined speed, which is equal to or lower than a rated base speed or a rated turning gear speed of the driving element, and at a second speed greater than the rated base speed or the rated turning gear speed in accordance with the determined drive schedule.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
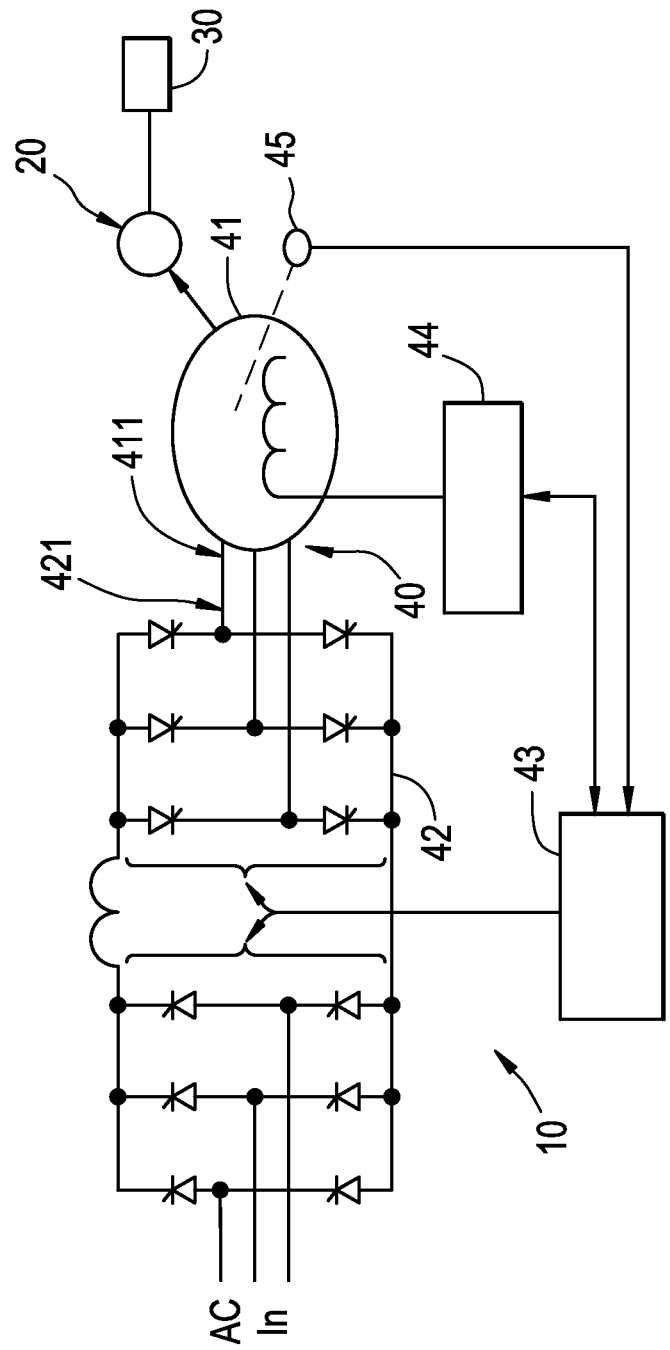
FIG. 1 is a schematic diagram of a driving element for driving shaft rotation.

With reference to FIG. 1, an apparatus 10 for driving shaft rotation of a machine or a gas turbine engine is provided. The apparatus 10 includes a shaft 20, which is rotatable about an axis thereof, a machine 30, which is operably coupled to the shaft 20 to be rotatable with the shaft 20, and which is configured to be responsive to a load applied to the machine 30 and a driving element 40. The driving element 40 is configured to engage with the shaft 20 at any speed, such as a first predefined speed and a second speed, to drive rotation of the shaft 20. In particular, the first predefined speed of the driving element 40 may be substantially equal to or below a rated base speed of the driving element 40 and/or a rated turning gear speed of the driving element 40 (i.e., around 0 to 3-6 RPMs) while the second speed is a speed above the rated base speed and/or the rated turning gear speed. That is, the driving element 40 is configured to engage with the shaft 20 at any speed above the rated base speed or the rated turning gear speed.

Thus, in accordance with various embodiments, the driving element 40 may engage with the shaft 20 to drive shaft rotation with an acceleration component during, for example, a high speed restart at which the shaft 20 is rotating at a speed above the base or turning gear speed of the driving element 40. Alternatively, the driving element 40 may engage with the shaft 20 in order to decelerate the rotation of the shaft 20 during a shutdown operation such that the shutdown operation can be completed in a relatively short time.

For the former embodiment, the driving element 40 may include a synchronous motor 41 that is configured to engage with and drive the shaft 20, a load commutated inverter (LCI) 42, such as a line commutated, phase controlled thyristor bridge that operates as a source converter and a controller 43. In operation, alternating current (AC) is input to the LCI 42, which is operably coupled to the controller 43 and thereby controlled by the controller 43 to output a variable frequency AC output 421 to corresponding stator terminals 411 of the synchronous motor 41. The AC output 421 may be modulated by a voltage controller 44 operably disposed between the controller 43 and the synchronous motor 41. The AC output 421 acts as an excitation signal that induces rotation in the synchronous motor 41 that in turn causes corresponding rotation of the shaft 20. This rotation of the synchronous motor 41 or the shaft 20 is sensed in the synchronous motor 41 by sensor 45, which issues a rotational speed signal to the controller 43.

During operations, such as those described above, the excitation signal is recorded as a comparison of speed (i.e., the rotational speed of the shaft 20) versus field current that is applied to the stator terminals 411. From such data, an excitation trend can be obtained for the apparatus 10.

For high speed restart situations, a current rotational speed of the shaft 20 is identified by incremental application of about 2 to about 5% of synchronous motor 41 amps field no load value (AFNL) and may be any speed below, at or above the rated base speed or the rated turning gear speed of the driving element 40. A drive schedule is then determined by the controller 43 based on the excitation trend data of the apparatus 10 and the identified current rotational speed of the shaft 20. The drive schedule is based on an appropriate excitation signal for the identified current rotational speed of the shaft 20, which is determined from the excitation trend data of the apparatus 10, and applied. That is, the controller 43 controls the LCI 42 to output the AC output 421 at the appropriate excitation signal for the identified current rotational speed of the shaft 20.

Figure 2:
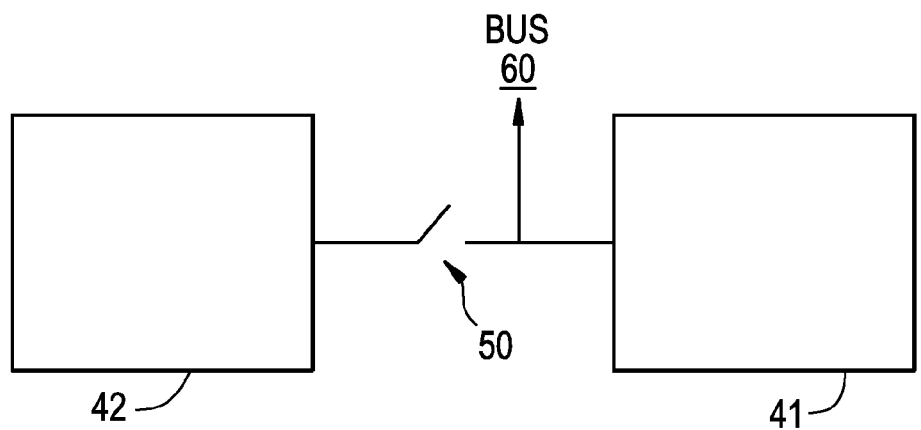
FIG. 2 is a schematic diagram of an arrangement of a gas turbine engine, a driving element and a generator.

With reference to FIG. 2, a switch 50 may be operably interposed between the synchronous motor 41 and the LCI 42. The switch 50 may occupy a first state at which the switch 50 is closed and the excitation signal is permitted to be transmitted from the LCI 42 to the synchronous motor 41 and second state at which the switch 50 is opened and the excitation signal is blocked. During normal operation, the switch 50 is closed as the apparatus 10 ramps up (i.e., when the gas turbine engine has not yet achieved self-sustained operation) and is open when the ramp up operation is no longer required (i.e., the gas turbine engine has achieved self-sustained operation).

In accordance with aspects, gas turbine engine shutdown/trip operations that conserve energy by utilizing kinetic energy available are provided whereby shutdown duration is reduced and plant availability is increased. Currently, in shutdown operations, a gas turbine engine is provided with fuel as a function of speed to maintain flame persistence until a flame out speed is reached. At this point, with inlet guide vanes substantially closed, available kinetic energy is consumed only by friction and windage losses. As a result, shaft 20 rotation requires a relatively long time to dissipate the available energy and reach 0 RPMs, the rated base speed or the rated turning gear speed.

The kinetic energy available during shutdown is given by $0.5*I*W^2$, where I=moment of inertia of shaft 20 and W=the rotational speed of the shaft 20. By utilizing the synchronous motor 41 and the LCI 42 in regeneration mode, however, this kinetic energy can be converted into electrical energy that can be supplied to an auxiliary bus 60. Deceleration can then be controlled by controlling the amount of electrical energy consumption (i.e., the amount of electrical energy sent to the auxiliary bus 60), which can be controlled by controller 43.

In accordance with embodiments, the synchronous motor 41 and the LCI 42 have regenerative capability to tap the kinetic energy available in the machine 30 (i.e., the gas turbine engine) and reduce coast down time. The capability is permitted by reconnection of the LCI 42 with the synchronous motor 41 by closing the switch 50 after it has been opened. Thereafter, a deceleration schedule similar to the drive schedule described above is determined such that the controller 43 controls the LCI 42 and the synchronous motor 41 to achieve a desired deceleration.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
a shaft, which is rotatable about an axis thereof;
a machine operably coupled to the shaft to be rotatable with the shaft and configured to be responsive to a load applied thereto;
a driving element, which is configured to engage with the shaft at a first predefined speed of the shaft rotation and at a second speed of the shaft rotation, which is greater than the first predefined speed and associated with a high-speed restart of the machine, to drive shaft rotation, the driving element being controlled to engage with the shaft at the second speed in accordance with:
a current rotational speed of the shaft, which is identified by an incremental application of about 2 to about 5% of synchronous motor amps field no load value, and
a drive schedule based on excitation trend data that defines an excitation signal for the current rotational speed of the shaft.

2. The apparatus according to claim 1, wherein the first predefined speed is a rated base speed of the driving element and the second speed is a speed above the rated base speed of the driving element.

3. The apparatus according to claim 1, wherein the first predefined speed is a rated turning gear speed of the driving element and the second speed is a speed above the rated turning gear speed of the driving element.

4. The apparatus according to claim 1, wherein the driving element engages with the shaft to drive shaft rotation with one of an acceleration component and a deceleration component.

5. The apparatus according to claim 1, wherein the machine comprises a component of a gas turbine engine.

6. The apparatus according to claim 1, wherein the driving element comprises a synchronous motor.

7. The apparatus according to claim 6, wherein the synchronous motor comprises a load commutated inverter (LCI).

8. The apparatus according to claim 7, further comprising a switch operably interposed between the synchronous motor and the LCI, an open condition of the switch being identifiable during coast down time and the switch being closeable to tap into a kinetic energy in the machine and to achieve a desired deceleration of the machine.

9. An apparatus, comprising:
a shaft, which is rotatable about an axis thereof;
a machine which is configured as a component of a gas turbine engine and which is operably coupled to the shaft to be rotatable with the shaft and configured to be responsive to a load applied thereto;
a driving element, which is configured to engage with the shaft at a first predefined speed of shaft rotation and at a second speed of shaft rotation, which is associated with a high-speed restart of the machine and is greater than the first predefined speed, to drive shaft rotation; and
a controller operably coupled to the driving element to control the driving element to engage with the shaft at the second speed in accordance with:
a current rotational speed of the shaft, which is identified by an incremental application of about 2 to about 5% of synchronous motor amps field no load value, and
a drive schedule based on excitation trend data that defines an excitation signal for the current rotational speed of the shaft.

10. The apparatus according to claim 9, wherein the drive schedule comprises an acceleration component.

11. The apparatus according to claim 9, wherein the drive schedule comprises a deceleration component.

12. The apparatus according to claim 9, wherein the drive schedule is determined from stored excitation data and the current rotational speed of the shaft.

13. The apparatus according to claim 12, wherein the stored excitation data comprises a field current for any given speed.

14. The apparatus according to claim 12, wherein the driving element is configured to identify the current rotational speed of the shaft.

15. A non-transitory computer implemented method for driving shaft rotation, comprising:
   storing excitation data relating to the driving of a rotation of a shaft, which is rotatable about an axis thereof and coupled to a component of a gas turbine engine that is responsive to a load applied thereto;
   identifying a current speed of the rotation of the shaft by an incremental application of about 2 to about 5% of synchronous motor amps field no load value;
   determining a drive schedule defining an excitation signal from the excitation data and the current speed; and
   applying the excitation signal to a driving element to thereby control the driving element to engage with the shaft at a first predefined speed of shaft rotation, which is equal to or lower than a rated base speed or a rated turning gear speed of the driving element, and to engage with the shaft at a second speed associated with a high-speed restart greater than the rated base speed or the rated turning gear speed.

16. The method according to claim 15, wherein the drive schedule comprises an acceleration component.

17. The method according to claim 15, wherein the drive schedule comprises a deceleration component.

18. The method according to claim 15, wherein the determining of the drive schedule comprises accessing stored excitation data and the identifying of the current speed.

19. The method according to claim 18, wherein the stored excitation data comprises a field current for any given speed.

20. The method according to claim 18, wherein a controller of the driving element is configured to identify the current speed of the shaft rotation.

* * * * *